J. R. WILKINS.
EMBROIDERY WORK HOLDER.
APPLICATION FILED MAY 26, 1911.
1,016,463.
Patented Feb. 6, 1912.
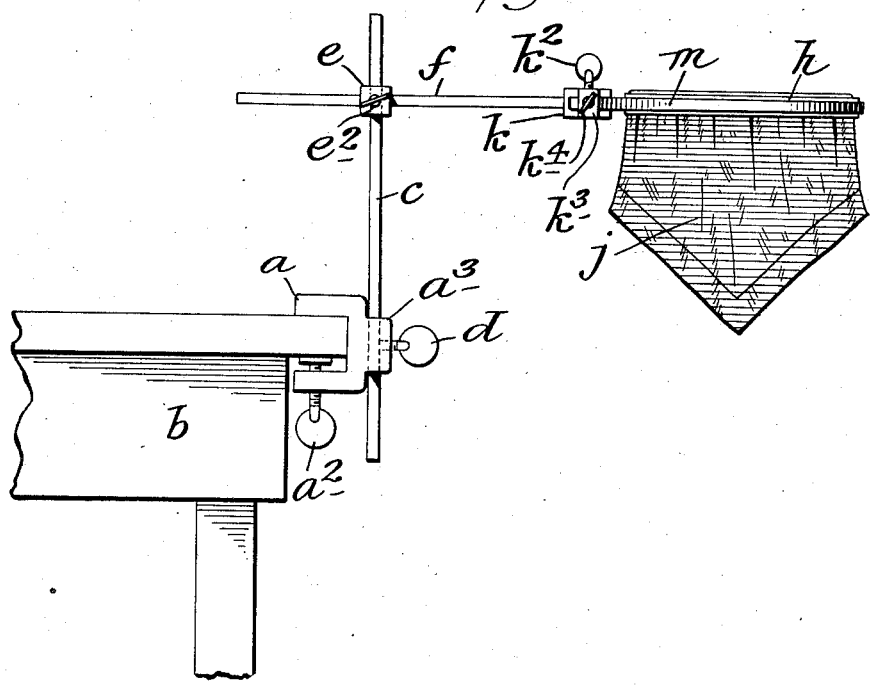
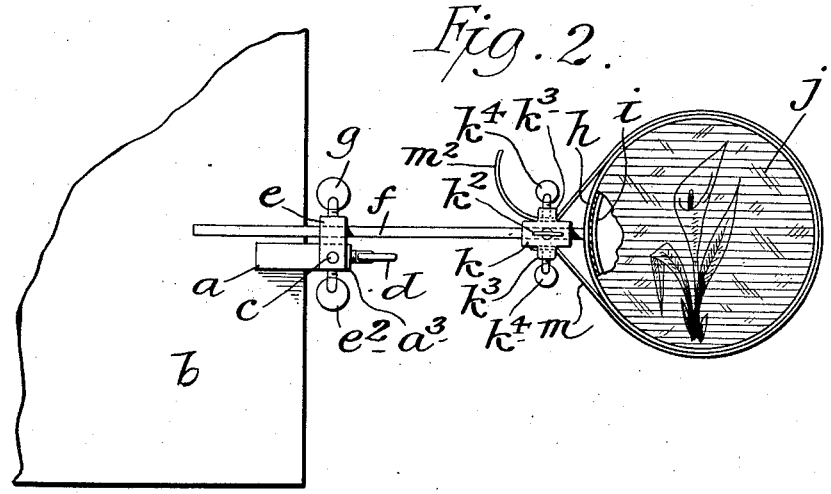
WITNESSES
INVENTOR.
JACOB R. WILKINS.
BY
ATTORNEYS.

UNITED STATES PATENT OFFICE.

JACOB R. WILKINS, OF YONKERS, NEW YORK.

EMBROIDERY-WORK HOLDER.

1,016,463.      Specification of Letters Patent.      Patented Feb. 6, 1912.

Application filed May 26, 1911. Serial No. 629,733.

*To all whom it may concern:*

Be it known that I, JACOB R. WILKINS, a citizen of the United States, and residing at Yonkers, in the county of Westchester and State of New York, have invented certain new and useful Improvements in Embroidery-Work Holders, of which the following is a specification, such as will enable those skilled in the art to which it appertains to make and use the same.

This invention relates to devices for holding embroidery work or fabrics to be embroidered, and the object thereof is to provide an improved device of this class which may be conveniently connected with a table, desk or other support and which may be adjusted into any desired position; and with this and other objects in view the invention consists in a device of the class specified, constructed as hereinafter described and claimed.

The invention is fully disclosed in the following specification of which the accompanying drawing forms a part, in which the separate parts of my improvement are designated by suitable reference characters in each of the views, and in which:—

Figure 1 is a view showing my improved embroidery holder connected with a table, desk or other support, and; Fig. 2 a plan view thereof.

In the practice of my invention I provide a clamp device $a$ comprising parallel jaws one of which is provided with a set screw $a^2$ whereby said clamp device may be connected with a table, desk or other support $b$, as shown. The clamp device $a$ is provided with a head $a^3$ through which is passed a vertical rod $c$ which is adjustable in said head and may be held in any desired position by means of the set screw $d$.

Mounted on and adjustable on the rod $c$ is a block $e$ having a set screw $e^2$ and passed horizontally through the block $e$ is an arm rod $f$ which is made adjustable in said block by means of a set screw $g$. I also provide two rings $h$ and $i$ one of which is smaller than the other, and, in practice, the work piece or fabric $j$ is placed, on or over the smaller and said ring is inserted into the ring $h$ and is held therein by friction, in the usual manner. I also mount on the arm rod $f$ a block $k$ having a set screw $k^2$ whereby said block may be adjusted on said arm and said block is provided with side projections or members $k^3$ having set screws $k^4$ and in connection with said block I employ a flexible band or strip $m$ one end of which is secured in one of said side projections or members by one of said set screws and the other end $m^2$ of said strip is passed through the other side member or projection and adapted to be adjusted therein by means of the other set screw $k^4$. The flexible strip or band $m$ is passed around the rings $h$ and $i$ when said rings $h$ and $i$ are connected and said strip or band serves to hold said rings $h$ and $i$ in the position shown in the drawing, in which position the ring $h$ bears on the end of the arm rod $f$. The strip or band $m$ is preferably composed of metal and will securely hold the rings $h$ and $i$, which constitute the work head, in the position shown, and by reason of the adjustable connection of the rod $f$ with the rod $c$ and the rod $c$ with the clamp $a$ the said work head may be easily adjusted into any desired position and any suitable means may be provided, if desired, for pulling the end $m^2$ of the strip or band $m$ through the corresponding side of the head $k$ so as to securely hold the work head, it being understood that the said work head has no direct connection with the arm rod $f$, and by means of the strip or band $m$ a work head of any desired size may be employed, and it will also be understood that the work head shown and described consisting of the rings $h$ and $i$ forms no part of my invention, which is limited to the means shown and described for supporting or holding said work head.

Having fully described my invention, what I claim as new and desire to secure by Letters Patent, is:—

1. An embroidery work holder provided with a member with which is connected a block or head, and a flexible band one end of which is secured in one side of said block or head and the other end of which is adjustable in the other side thereof, said band being adapted to be passed around a circular work piece or head which is adapted to bear on said member.

2. An embroidery work holder provided with an arm, a block or head adjustable on said arm, and a flexible band one end of which is secured in one side of said block or head and the other end of which is adjustable therein, said band being adapted to be passed around a circular work piece or
5 head which is adapted to bear on the end of said arm.

In testimony that I claim the foregoing as my invention I have signed my name in presence of the subscribing witnesses this 24th day of May 1911.

JACOB R. WILKINS.

Witnesses:
C. E. MULREANY,
F. G. AT LEE.

Copies of this patent may be obtained for five cents each, by addressing the "Commissioner of Patents. Washington, D. C."